(12) United States Patent
Wang et al.

(10) Patent No.: US 9,657,635 B2
(45) Date of Patent: May 23, 2017

(54) WASTEGATE ACTUATOR GAIN ADJUSTMENT

(71) Applicant: Ford Global Technologies, LLC, Dearborn, MI (US)

(72) Inventors: Yan Wang, Ann Arbor, MI (US); Matthew John Gerhart, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 14/517,630

(22) Filed: Oct. 17, 2014

(65) Prior Publication Data

US 2016/0108800 A1    Apr. 21, 2016

(51) Int. Cl.
| | | |
|---|---|---|
| F02B 37/12 | (2006.01) | |
| F02D 41/00 | (2006.01) | |
| F02D 41/14 | (2006.01) | |
| F02B 37/18 | (2006.01) | |
| F02D 41/20 | (2006.01) | |

(52) U.S. Cl.
CPC ............ *F02B 37/12* (2013.01); *F02B 37/18* (2013.01); *F02D 41/0007* (2013.01); *F02D 41/1401* (2013.01); *F02D 41/20* (2013.01); *F02D 2041/1409* (2013.01); *F02D 2041/1422* (2013.01); *F02D 2041/2065* (2013.01); *F02D 2200/703* (2013.01); *Y02T 10/144* (2013.01)

(58) Field of Classification Search
CPC .. F02B 37/12; F02D 41/0007; F02D 41/1401; F02D 2041/1409; F02D 2041/1422; F02D 2041/2065; F02D 2200/703; F02D 41/20
See application file for complete search history.

(56) References Cited

U.S. PATENT DOCUMENTS

| | | | |
|---|---|---|---|
| 5,333,948 A | 8/1994 | Austin et al. | |
| 5,532,889 A | 7/1996 | Stefansky et al. | |
| 7,006,911 B2* | 2/2006 | Wilhelm | F02D 35/0007 701/108 |
| 7,046,496 B2 | 5/2006 | Hsin | |
| 8,001,782 B2* | 8/2011 | Pursifull | F02B 37/007 60/602 |
| 2006/0091872 A1 | 5/2006 | Matsuura | |
| 2007/0253097 A1 | 11/2007 | Sun et al. | |
| 2010/0170244 A1 | 7/2010 | Brooks et al. | |
| 2011/0073089 A1* | 3/2011 | Meyer | F02D 41/1441 123/703 |
| 2012/0124993 A1 | 5/2012 | Kim | |
| 2012/0138827 A1 | 6/2012 | Kim | |

(Continued)

OTHER PUBLICATIONS

Wang, Yan et al., "Electric Actuator Current Control Responsive to Temperature," U.S. Appl. No. 14/256,757, filed Apr. 18, 2014, 40 pages.

*Primary Examiner* — Thai Ba Trieu
*Assistant Examiner* — Brandon Lee
(74) *Attorney, Agent, or Firm* — Julia Voutyras; McCoy Russell LLP

(57) ABSTRACT

Various methods for controlling a wastegate actuator are provided. In one example, a method comprises adjusting one or more wastegate controller gains responsive to limiting current supplied to a wastegate actuator, the current limited in response to a temperature of the wastegate actuator exceeding a threshold.

20 Claims, 6 Drawing Sheets

(56) References Cited

U.S. PATENT DOCUMENTS

2013/0150984 A1    6/2013  Nigro et al.
2013/0175970 A1    7/2013  Tazawa et al.
2013/0287568 A1   10/2013  Miranda
2013/0312406 A1*  11/2013  Landsmann .......... F02B 37/186
                                              60/602

* cited by examiner

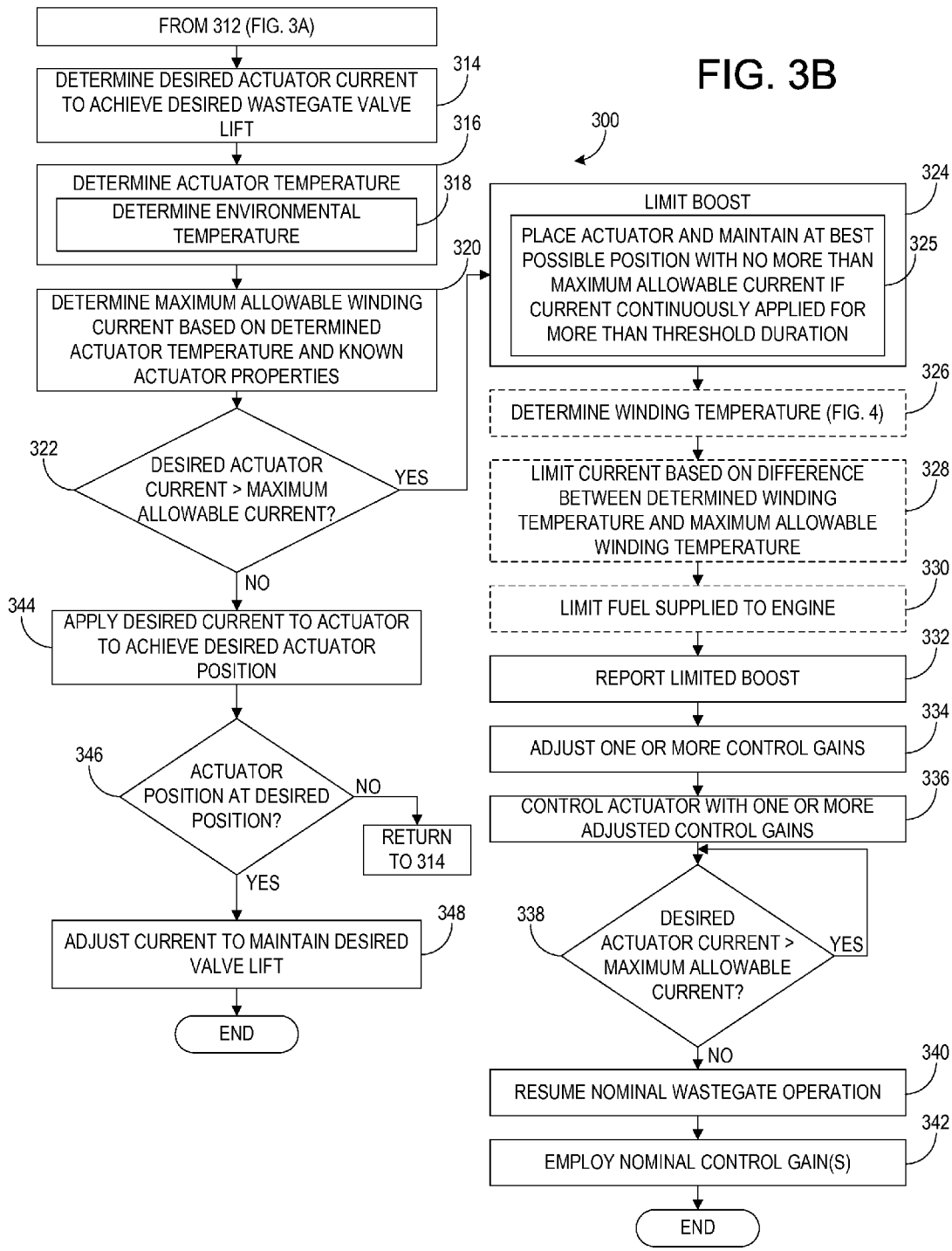

WASTEGATE ACTUATOR GAIN ADJUSTMENT

FIELD

The field of the disclosure relates to controlling a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side of an engine and the compressor is coupled to an intake manifold side of the engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve anywhere between a fully open position and a fully closed position (e.g., at a valve seat) to achieve the desired boost based on operating conditions. The actuator may be an electric actuator such as an electric motor, for example.

Some wastegate actuators implement a control strategy in which one or more gain factors are used—for example, in a control strategy in which proportional, integral, and/or derivative control is employed. When PID control is employed, three control gains respectively control the contribution of the proportional, integral, and derivative terms in a relation that provides an output (e.g., a wastegate actuator position) for an input (e.g., an error such as the difference between a desired and a measured wastegate actuator position).

In some scenarios, the electric motor of a wastegate actuator may be exposed to high surrounding temperatures due to proximate flow of exhaust gasses, and may exhibit high temperatures itself, for example due to the continuous reception of high electrical currents—e.g., during operating conditions in which high or maximum boost is consistently desired. During these conditions, the current supplied to the motor may be limited to maintain the motor temperature at an acceptable level and prevent motor degradation. The control gains employed by the wastegate actuator when current supply to the motor is not limited, however, may be unsuitable for times at which current supply to the motor is limited.

U.S. Pat. App. No. 2010/0170244 describes systems and methods for adjusting controller gain in response to a current system operating condition and a static decoupling gain set comprising a plurality of gain value sets. Actuator responses may then be determined based on the adjusted controller gain and at least one error term. The actuator responses may include a turbocharger swallowing capacity modifier position such as a turbocharger wastegate position. A gain set may be selected as a function of engine speed and/or torque output, for example.

The inventors herein have recognized an issue with the approach identified above. Specifically, controller gain is not adjusted in response to limitation of the current supplied to a wastegate actuator. As such, desired wastegate control cannot be provided for operating modes in which wastegate actuator current is limited and not limited, potentially leading to undesired wastegate operation during times of actuator current limiting.

One approach that at least partially addresses the above issues includes a method comprising adjusting one or more wastegate controller gains responsive to limiting current supplied to a wastegate actuator, the current limited in response to a temperature of the wastegate actuator exceeding a threshold.

In a more specific example, adjusting the one or more wastegate controller gains includes reducing the one or more wastegate controller gains relative to respective nominal gains.

In this way, desired wastegate actuator control may be provided for operating modes in which current supply to the wastegate actuator is limited and for nominal operating modes in which current supply to the wastegate actuator is not limited. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A & 3B show a flowchart illustrating a method for controlling a turbocharger via a wastegate.

DETAILED DESCRIPTION

Figure 1:
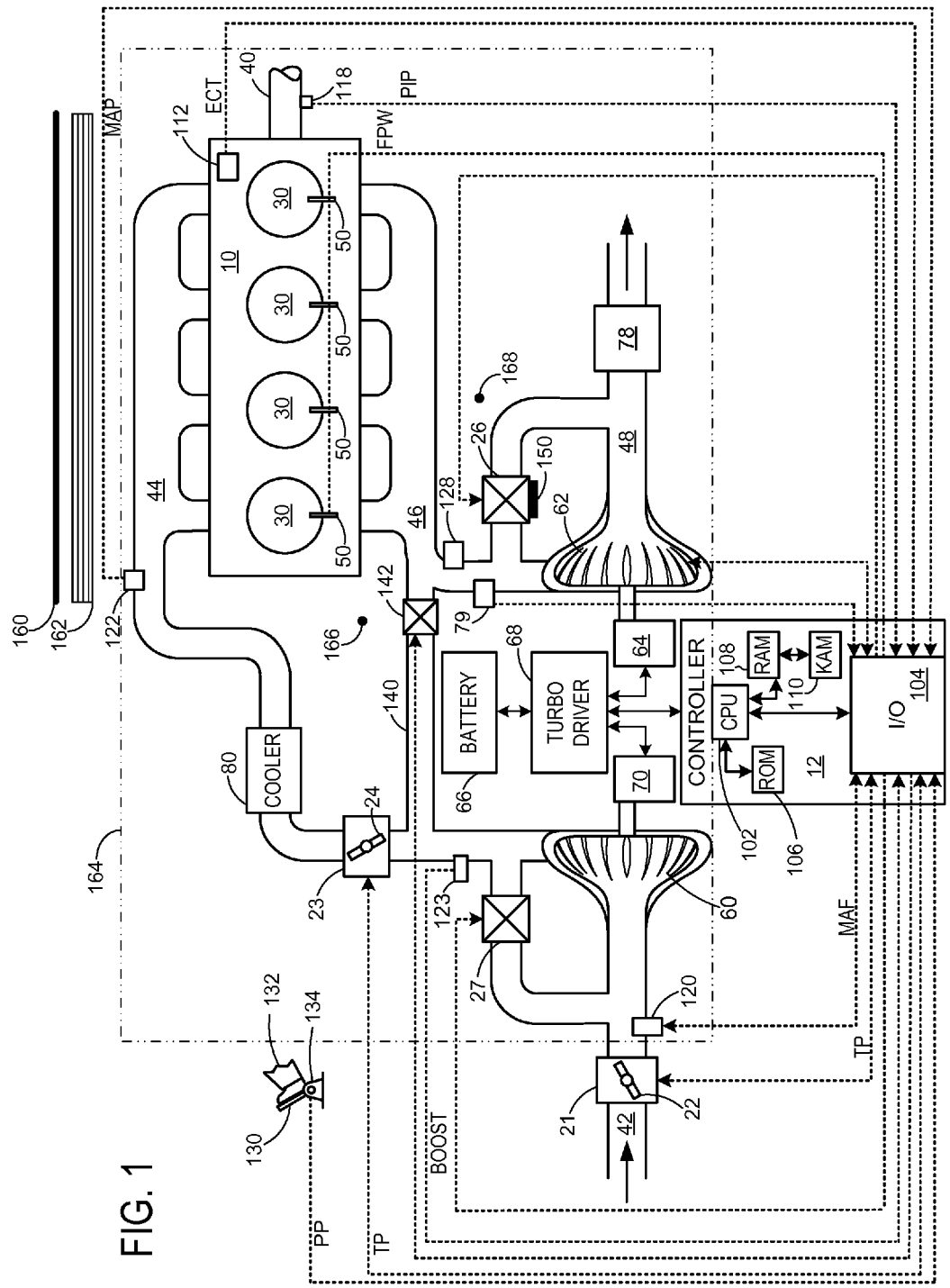
FIG. 1 is a schematic diagram showing an example engine.
Figure 2:
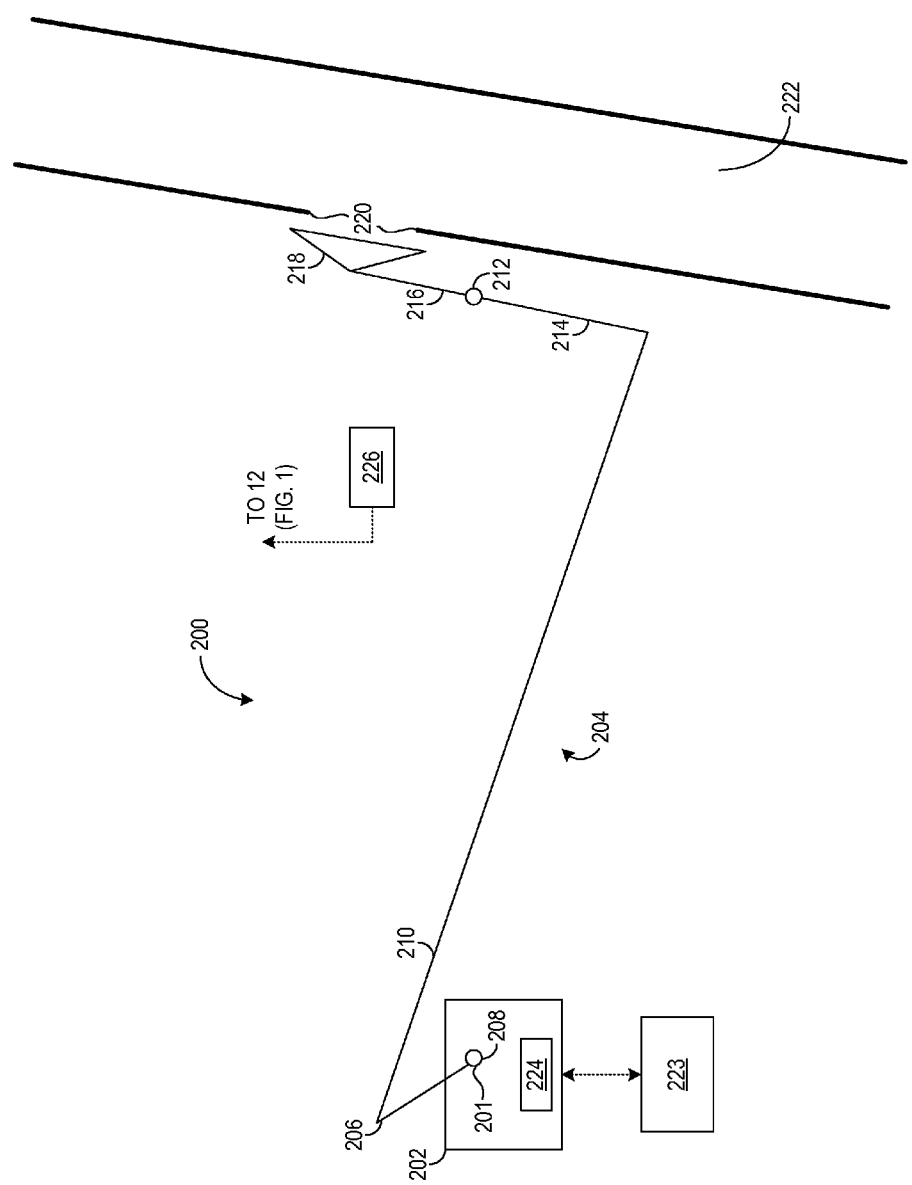
FIG. 2 shows exemplary wastegate arrangement.
Figure 3A:
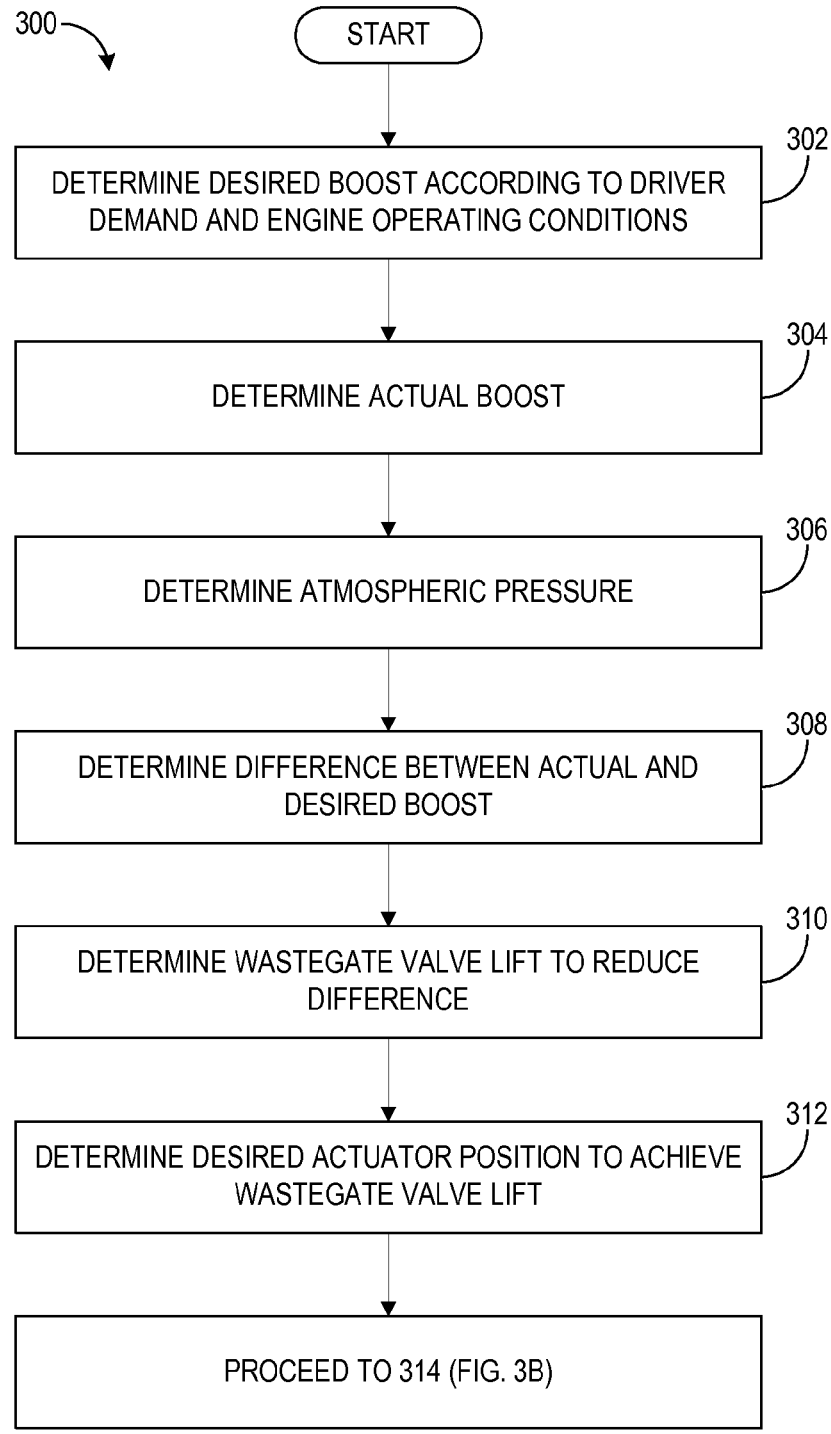
Figure 4:
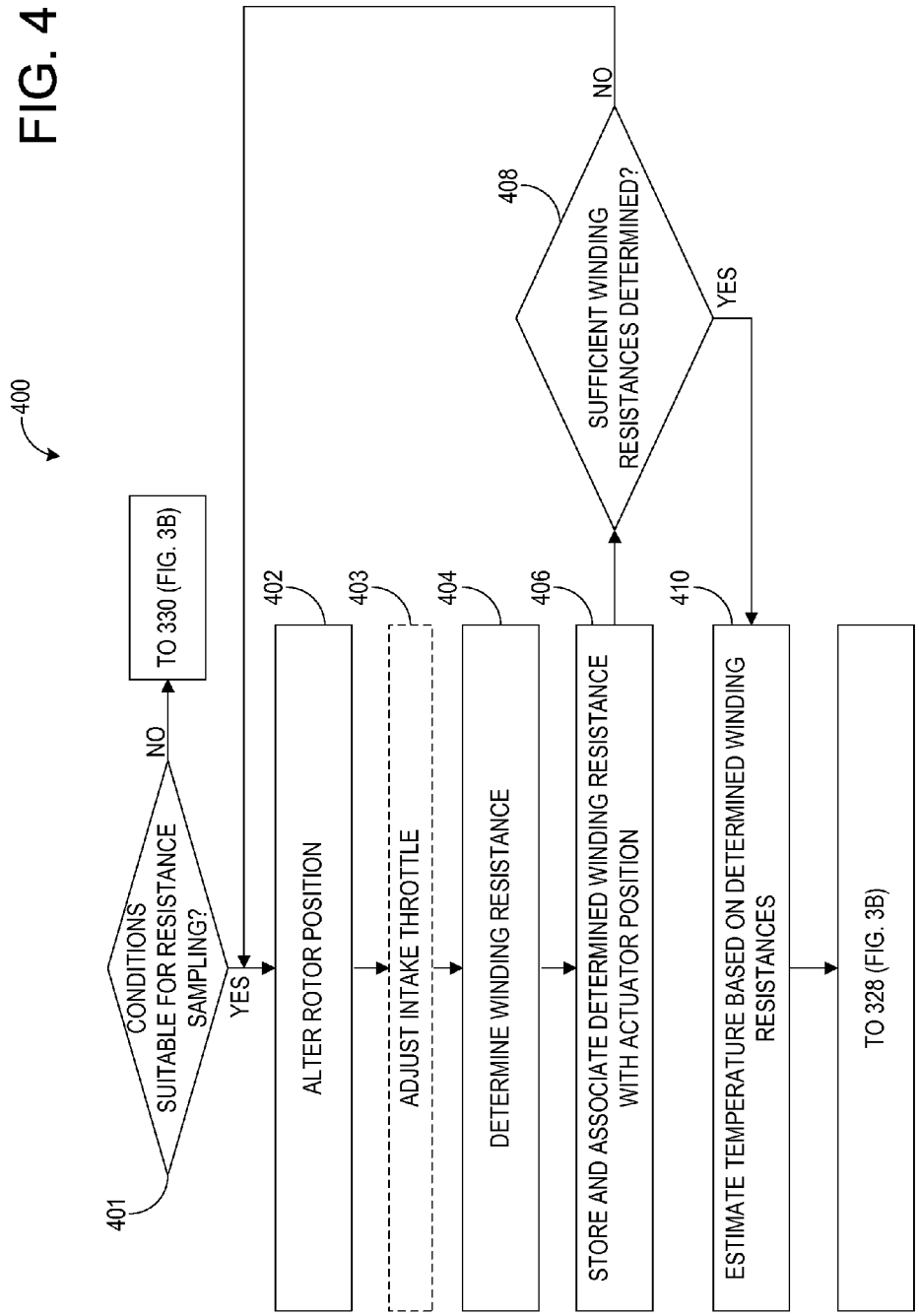
FIG. 4 shows a flowchart illustrating a method for determining the temperature of a wastegate actuator based on winding resistance.
Figure 5:
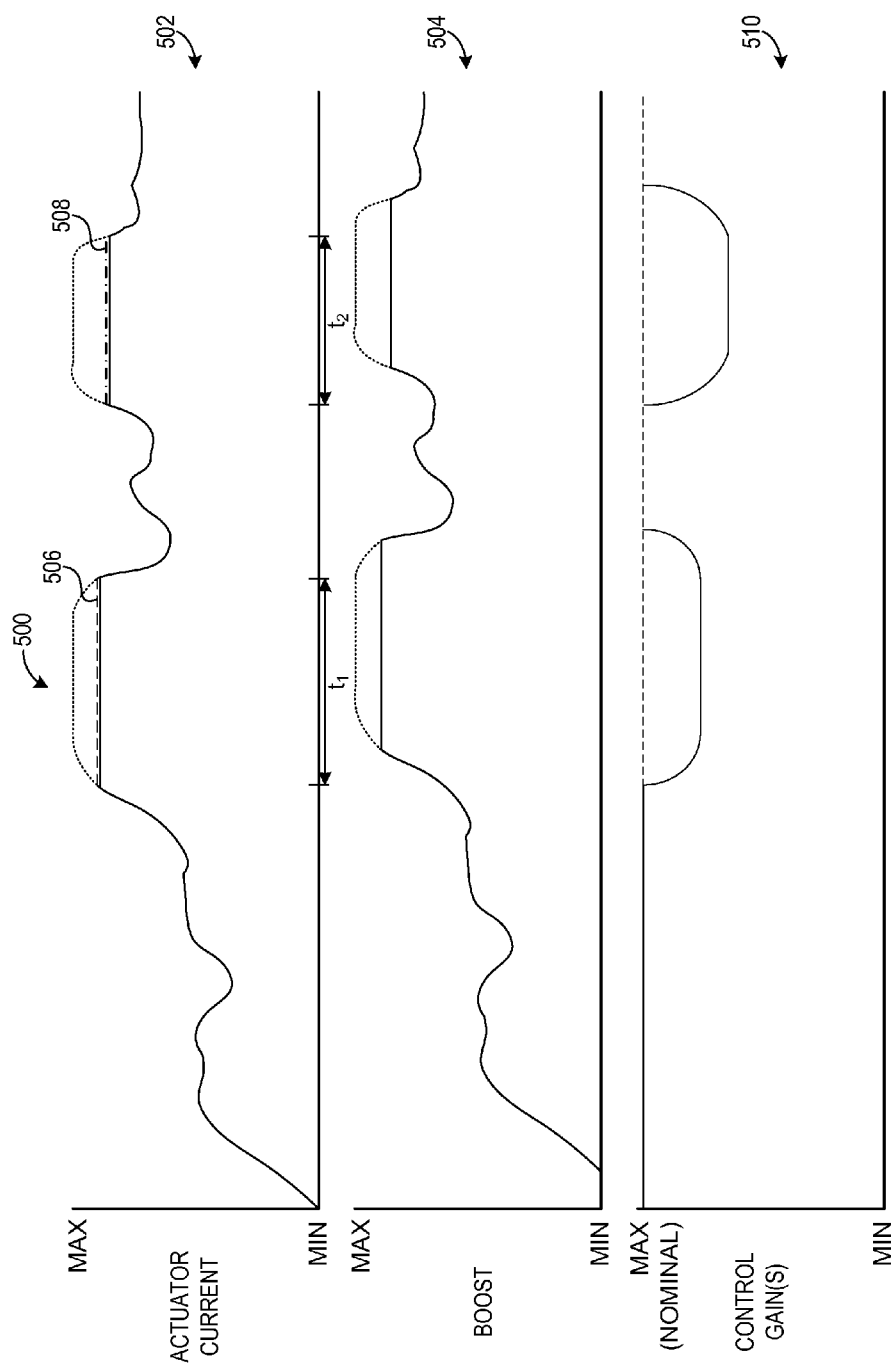
FIG. 5 shows a graph illustrating actuator current and boost limiting according to the method of FIGS. 3A-B for an exemplary drive cycle.

Various methods for controlling a wastegate actuator are provided. In one example, a method comprises adjusting one or more wastegate controller gains responsive to limiting current supplied to a wastegate actuator, the current limited in response to a temperature of the wastegate actuator exceeding a threshold. FIG. 1 is a schematic diagram showing an example engine, FIG. 2 shows exemplary wastegate arrangement, FIGS. 3A & 3B show a flowchart illustrating a method for controlling a turbocharger via a wastegate, FIG. 4 shows a flowchart illustrating a method for determining the temperature of a wastegate actuator based on winding resistance, and FIG. 5 shows a graph illustrating actuator current and boost limiting according to the method of FIGS. 3A-B for an exemplary drive cycle. The engine of FIG. 1 also includes a controller configured to carry out the methods depicted in FIGS. 3A, 3B, and 4.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Sensor 128 may alternately be positioned downstream of turbine 62. Emission control device 78 may be a three way catalyst (TWC), NOx trap, various other emission control devices, or combinations thereof.

In some embodiments, exhaust temperature may be inferred based on engine operating conditions such as speed, load, air-fuel ratio (AFR), spark retard, etc. In other embodiments, an exhaust-side temperature sensor 79 may be positioned upstream of an inlet side of turbine 62 and downstream of an outlet side of exhaust manifold 46. Exhaust-side temperature sensor 79 may be particularly configured to sense the temperature of gasses flowing through exhaust passage 48 and relay the sensed temperature as a signal ET to controller 12. Sensor 79 may be a thermocouple, for example. More generally, exhaust temperature may be measured by sensors 79 and/or other sensors not shown located in exhaust passage 48. In other embodiments, exhaust-side temperature sensor 79 may be configured in other manners—for example, the exhaust-side temperature sensor may be configured to sense the inlet temperature of turbine 62.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70.

Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 1 also generally shows a portion of a vehicle front end 160, grille shutters 162 positioned at the vehicle front end, and an engine compartment 164 at least partially housing a plurality of components including engine 10. The position (e.g., fin angle) of grille shutters 162 may be controlled by engine 12 to adjust air levels inducted into engine compartment 164, for example. The grille shutter position may be used along with other operating parameters such as vehicle speed to estimate ambient temperature. In particular, the ambient temperature of a region inside engine compartment 164 may be estimated; in one example the ambient temperature may correspond to the temperature of air surrounding and proximate wastegate actuator 150 (e.g., at a position 166), or in another example the ambient temperature may correspond to the temperature of air in the direct vicinity and proximate the wastegate actuator (e.g., at a position 168).

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator including an electric motor. In some examples, actuator 202 may particularly be a rotary actuator having an element that undergoes rotation to thereby alter the actuator position. An output shaft 201 of actuator 202 is coupled to a linkage 204 and in particular a first link 206 of the linkage. As shown, linkage 204 in the illustrated embodiment is a four-bar, though other linkages are possible such as a linear rod. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a contiguous member. At an end opposite actuator 202, linkage 204 is coupled at fourth link 216 to a wastegate valve 218, which may be positioned at a fully open position, a fully closed position, or anywhere therebetween relative to a valve seat 220. Valve seat 220 is shown as being disposed in a portion of an exhaust passage 222, which may be exhaust passage 48 of engine 10 in FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled according to desired boost and other operating conditions. The position of wastegate valve 218 of wastegate 200 may be particularly controlled via actuation of actuator 202 and placement of its output shaft 201, movements of which may be translated to the exhaust valve via linkage 204.

In the embodiment depicted in FIG. 2, wastegate 200 includes a wastegate controller 223 operable to drive wastegate actuator 202 so that a desired wastegate position, and thus desired boost delivery to an engine, are achieved. In some examples, wastegate controller 223 may receive a desired boost level from an engine controller such as controller 12 of FIG. 1 and determine a corresponding actuator (or wastegate) position that results in the delivery of the desired boost level, driving actuator 202 according to the determined actuator position. Wastegate controller 223 may employ various suitable mechanisms to drive actuator 202 in this manner, including but not limited to feedback, feedforward, proportional, integral, and/or derivative (PID) control. In some examples, wastegate controller 223 may drive actuator 202 according to one or more gains—e.g., three gains for each of the proportional, integral, and derivative control mechanisms. The gains may numerically scale the magnitude of PID control, and may influence various outputs determined by controller 223—for example, the responsiveness (e.g., speed, overshoot) of actuator (e.g., wastegate valve) positioning, actuator current determination, etc. It will be appreciated that other wastegate control approaches are possible, however. In some embodiments, for example, wastegate controller 223 may be integrated within an engine controller (e.g., controller 12 of FIG. 2).

In some examples, a boost control system operable to control the supply of boost to an engine (e.g., engine 10 of FIG. 1) may comprise a turbocharger including wastegate 200 having wastegate actuator 202 coupled to wastegate valve 218, and a controller (e.g., wastegate controller 223, controller 12) operable to drive the wastegate actuator based on desired boost according to one or more control gains. In some approaches, the one or more control gains may be selected based on a temperature of wastegate actuator 202. In particular, one or more reduced control gains may be selected if the temperature of wastegate actuator 202 exceeds a threshold. The one or more reduced control gains may be reduced relative to respective nominal control gains. The one or more reduced control gains may be selected to provide desired wastegate control, for example in the event that current supply to wastegate actuator 202 is limited. One or more nominal control gains may be selected, however, if the temperature of wastegate actuator 202 is equal to or less than the threshold temperature. The one or more nominal control gains may be greater than their respective reduced control gain counterparts.

Wastegate 200 further includes a position sensor 224 that may be configured to measure changes in the angle of output shaft 201 to thereby estimate the location of wastegate valve 218. In some examples, a rotary encoder configured to sense rotation of a rotating component in actuator 202 may be employed, with pulses generated therefrom sent to wastegate controller 223. Position sensor 224 may be adapted for embodiments in which a linear rod linkage is used in lieu of the four-bar configuration shown in FIG. 2, however. In any case, a measurement by position sensor 224 may be used to determine the position of wastegate valve 218—particularly, the distance from the top surface of valve seat 220 to the bottom surface of wastegate valve 218. In other embodiments, however, the position of wastegate valve may be determined based on a soft model using one or more of the signals (e.g., BOOST) described above with reference to FIG. 1 and sent to controller 12.

It will be appreciated that wastegate 200 and various components thereof may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance (e.g., winding resistance), if these two quantities are known or can be measured or inferred. Further, as described above, other types of linkages may be provided to couple actuator 202 with wastegate valve 218, including but not limited to a linear rod. Moreover, a bias (not shown) may be coupled to wastegate valve 218 to position the valve in a default position when the valve is not actuated by actuator 202.

At operating temperatures above a threshold, operation of actuator 202 may become degraded, for example due to electric motor degradation. As such, determination of the operating temperature of actuator 202 may be sought, with various actions taken if the operating temperature exceeds a threshold. A variety of factors may contribute to the operating temperature of actuator 202, referred to herein as the "actuator temperature". "Actuator temperature", as used herein, particularly refers to the temperature of the windings of actuator 202, and as described in further detail below may be inferred based on a determination of the temperature of the ambient environment surrounding the actuator, or in other embodiments, direct estimation of the winding temperature based on a determination of the resistance of the windings. Because ambient temperatures in the environment (e.g., wastegate assembly 200) surrounding actuator 202 may significantly affect the actuator temperature, and ambient environmental temperatures may be affected by the flow of proximate exhaust gas such as exhaust gas flowing through exhaust passage 222, wastegate assembly 200 may include a temperature sensor 226 configured to sense the temperature of the ambient environment surrounding actuator 202, which in some examples may be used to determine the actuator temperature. In other embodiments, the environmental temperature may be estimated based on various engine and vehicle operating conditions. For example, the operating conditions may include ambient temperature, engine speed, engine load, vehicle speed and a grille shutter position (e.g., fin angle of grille shutter 162 of FIG. 1). As described above, the environmental temperature may correspond to a region generally proximate wastegate actuator 202 (e.g., corresponding to position 166 of FIG. 1), or a region proximate and in a direct vicinity to the actuator (e.g., corresponding to position 168 of FIG. 1).

For embodiments in which the environmental temperature surrounding actuator 202 is used to determine the actuator temperature, a maximum current that can be supplied to the actuator may be determined for a given environmental temperature. The maximum current is the maximum allowable current that can be applied to actuator 202 for the given environmental temperature without exceeding an unacceptable risk of degraded actuator operation, and may be determined because the continuous application of high currents can exacerbate the possibility of actuator degradation. The current applied to actuator 202 may be limited (e.g., reduced relative to a maximum current than can be applied to the actuator) for scenarios in which the actuator has assumed a relatively high temperature and supply of the maximum current is desired, for example because maintenance of the fully closed position and thus provision of maximum boost is desired. In this example, current is limited, as supply of the maximum possible current to the actuator 202 would contribute to the already high temperature assumed by the actuator due to high surrounding temperatures and present an unacceptable degradation risk to the actuator.

As a non-limiting example, the following relation may yield the temperature of windings of actuator 202 as a function of time: $T(t) = I^2 * R * K_T * (1 - e^{-t/\tau}) + T_E$, where T is the actuator winding temperature (e.g., used in some examples as the actuator temperature), t is time, I is winding current, R is winding resistance, $K_T$ is thermal resistance of the windings (e.g., in units of °C./W), $\tau$ is a thermal time constant, and $T_E$ is the environmental temperature (e.g., inferred as described above or based on output from temperature sensor 226). In the limit that time t approaches infinity, however, the relation assumes the following form: $T = I^2 * R * K_T + T_E$. The maximum current that may be supplied to the actuator indefinitely may thus be determined based on this relation according to the following rearranged relation: $I_{MAX} = \text{sqrt}((T_{MAX} - T_E)/(R * K_T))$, where $I_{MAX}$ is the maximum continuous current that may be supplied to the actuator indefinitely (referred to herein as the "maximum allowable current"), and $T_{MAX}$ is the maximum allowable winding temperature—i.e., the maximum temperature that the windings of actuator 202 may assume before undergoing degradation. In some examples, the maximum allowable winding temperature may be determined offline based on known properties of actuator 202.

In other examples, the maximum allowable current may be determined based on online determination of the winding temperature, alternatively or additionally to the environmental temperature. For embodiments in which winding temperature is determined online and used in lieu of environmental temperature, the maximum allowable current may be determined based on the difference between the instant winding temperature and the maximum allowable winding temperature. In some examples, changes to the current supplied to actuator 202 may be proportional to this difference.

In some embodiments, the instant winding temperature of actuator 202 may be determined based on the winding resistance of the actuator. In some examples, this winding resistance may be determined based on an average of multiple sampled winding resistances of the actuator rotor throughout a rotational range of the rotor. Sampling and averaging winding resistances at multiple rotor angles throughout a rotational range (e.g., a full 360° turn, a full half 180° turn, any subset or superset of a full 360° turn, etc.) may increase the accuracy of winding resistance estimation and actuator temperature estimation, as winding resistance may be dependent on rotor position in an electric motor. A given winding resistance may be determined in various suitable manners, including but not limited to measuring the voltage and current supplied to actuator 202. Current sensing may be facilitated via the current sensor or probe described above, for example. An averaged winding resistance may then be related to a winding temperature based on known material properties of the windings, for example via a lookup table. A method 400 shown in FIG. 4 and described below may be employed to obtain winding resistances during accommodating operational windows.

As described above, limiting the supply of current to actuator 202 may be desired under certain conditions. When the supply of current to actuator 202 is limited, various actions may be taken in response to current limiting. One such action may include adjusting the one or more control gains utilized by wastegate controller 223 to control actuator 202, as the one or more control gains employed by the controller when the supply of current to the actuator is not limited (referred to herein as "nominal control gains") may not be appropriate for actuator control while the supply current is limited. For example, use of the nominal control gains during supply current limiting may result in unstable actuator and wastegate valve positioning, which may in turn increase the difficulty of delivering desired boost to an engine. As such, in some examples one or more control gains whose magnitudes are reduced relative to their nominal control gain counterparts may be employed. While the use of reduced control gains may decrease the transient response of wastegate 200, an acceptable wastegate response may nevertheless be maintained, as wastegate control with reduced control gains may still exhibit a faster response than overall boost control, whose response depends on components other than the wastegate and fluid dynamics. As a non-limiting example of control gain adjustment, wastegate controller 223 may operate actuator 202 in part according to a difference between a desired actuator position (e.g., determined based on desired boost received from engine controller 12 of FIG. 1) and an actual actuator position (e.g., measured by position sensor 224). This difference, which may be considered error, may be multiplied by a gain whose value may be adjusted (e.g., reduced) in response to the limitation of current supplied to actuator 202. In some approaches, the gain may be modified to the extent to which current supply to actuator 202 is limited, alternatively or in addition to other parameters. Further, a relatively gradual transition from the use of nominal control gain(s) to modified control gain(s) may be performed to mitigate adverse and abrupt transients in wastegate operation that may otherwise result from non-gradual transitions in the use of nominal to non-nominal control gain(s). Suitable mechanisms such as a suitable filter may be employed to facilitate such gradual control gain transition between adjusted gain(s) and respective nominal gain(s).

As described above, in some examples wastegate controller 223 may employ proportional, integral, and derivative (PID) control mechanisms. As such, three gains ($K_P$, $K_I$, $K_D$) for each of the proportional, integral, and derivative controls may be employed by controller 223. As also described above, controller 223 may operate actuator 202 in part based on a difference (e.g., error) between a desired parameter (e.g., desired actuator position) and a corresponding actual (e.g., measured or inferred) parameter (e.g., actual actuator position). Controller 223 may attempt to minimize this error in order to achieve the closest possible correspondence between the desired and actual parameters by determining output according to the following relation: $u(t)=K_P*e(t)+K_I*\int e(\tau) \, d\tau + K_D*(de(t)/dt)$, where u(t) is the PID control output (e.g., an actuator position, an actuator current whose application results in the actuator position, etc.), t is time, e(t) is the error as a function of time, $\tau$ is a variable of integration (where the limits of integration run from 0 to t, for example), and $K_P$, $K_I$, and $K_D$ are the proportional, integral, and derivative control constants determining the contributions of the proportional, integral, and derivative terms, respectively. As such, in response to limiting current supply to actuator 202, one or more of (in some examples, all) of the PID gains $K_P$, $K_I$, and $K_D$ may be adjusted as described herein. In some examples, the PID gains may be modified equally—for example, each of $K_P$, $K_I$, and $K_D$ may be multiplied by the same constant (e.g., determined as a function of the extent of current limiting). In other examples, the PID gains may be uniquely modified; each of $K_P$, $K_I$, and $K_D$ may be multiplied by a respective constant determined for that particular PID gain.

Various suitable mechanisms may be employed to determine and/or store PID gain adjustments; for example, a function may be used whose output is a gain adjustment (e.g., a constant to be multiplied to the unmodified gain to thereby generate the modified gain) and whose input is a quantification of the extent of current limiting (e.g., the difference between the maximum current that can be supplied to actuator 202 and the limited current to be applied to the actuator). In another example, a lookup table storing gain adjustments as a function of one or more parameters (e.g., the difference between the maximum current that can be supplied to actuator 202 and the limited current to be applied to the actuator, actuator temperature, etc.) may be accessed with the one or more parameters to retrieve the gain adjustments. It will be appreciated that the gain adjustment described herein may be employed in conjunction with non-PID gains including those not associated with wastegate or actuator positions.

FIGS. 3A and 3B show a flowchart illustrating a method 300 for controlling a turbocharger via a wastegate. Method 300 may be executed by an engine controller (e.g., controller 12 of FIG. 1) and/or a wastegate controller (e.g., wastegate controller 223 of FIG. 2) to control wastegate 200 via actuator 202 of FIG. 2, for example. In some examples, the method may include determining a desired parameter (e.g., actuator position, wastegate position, boost pressure, etc.) and a corresponding actual parameter (e.g., actual actuator position, actual wastegate position, actual boost pressure, etc.). In these examples, the wastegate may be adjusted according to the difference between the desired and corresponding actual parameter.

At 302, the method includes determining a desired boost according to driver demand and engine operating conditions. The conditions assessed may be directly measured with sensors, such as sensors 112, 118, 120, 122, 123, and 134, for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

At 304 of the method, an actual boost pressure is determined. The actual boost may be directly measured from a sensor, such as sensor 123. The measurement may be sent to controller 12 via the BOOST pressure signal and stored in a computer-readable storage medium (e.g., ROM 106, RAM 108, and/or KAM 110 of controller 12 in FIG. 1), for example. In an alternative embodiment, the actual boost pressure may be estimated based on other operating parameters, such as based on MAP and RPM, for example.

At 306 of the method, atmospheric pressure is determined. For example, atmospheric pressure may be measured from the MAP sensor at engine start-up, and/or estimated based on operating conditions of the engine, including MAF, MAP, throttle position, etc. The measurement may be sent to the engine controller and stored in the computer readable storage medium. In an alternative embodiment, the atmospheric pressure may be estimated based on other operating parameters.

At 308 of the method, a difference between the actual and desired boost is determined. The engine controller may determine the difference, for example. In some examples, the difference may be determined by subtracting the desired boost from the actual boost.

At 310 of the method, a wastegate valve lift is determined in order to reduce the difference between the actual and desired boost determined at 308. In some examples, the difference between the actual and desired boost, in addition to the current wastegate valve lift (e.g., sensed via position sensor 224), is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle. Mapping to a wastegate duty cycle may include using lookup tables or calculating the wastegate duty cycle. A wastegate control (WGC) signal may include pulse width modulation via the wastegate duty cycle to adjust the wastegate. The wastegate valve lift may be achieved by feed-forward, feedback, and/or other control algorithms, for example. The wastegate duty cycle may be generated by the engine controller or the wastegate controller, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

At 312 of the method, a desired actuator position is determined to achieve the wastegate valve lift determined at 310. The desired actuator position may be fed as an input to various suitable control mechanisms including those described above. In some embodiments, a desired actuator orientation may be alternatively determined, such as the rotational orientation of a rotating component in the actuator.

Turning now to FIG. 3B, at 314 of the method, a desired actuator current is determined to achieve the desired wastegate valve lift. The desired actuator current may be determined based on the difference between the instant actuator position and the desired actuator position, as well as exhaust forces acting against the wastegate valve.

At 316 of the method, the temperature of the actuator is determined. Determination of the actuator temperature may include, at 318, determining the environmental temperature surrounding the actuator. As described above, the environmental temperature surrounding the actuator may be determined based on output from a sensor configured to measure such temperature—for example, output from temperature sensor 226 of FIG. 2 may be one input used to determine the environmental temperature. Other mechanisms may be employed to determine the environmental temperature of the actuator, however. In some examples, the environmental temperature may be estimated based on one or more operating parameters (e.g., ambient temperature, engine speed, engine load, vehicle speed, grille shutter position, etc.). The environmental temperature may correspond to a region generally proximate the actuator (e.g., at position 166 of FIG. 1), or a region proximate and in a direct vicinity to the actuator (e.g., at position 168 of FIG. 1).

At 320 of the method, the maximum allowable current that may be supplied to the actuator is determined based on the actuator temperature determined at 316 and known properties of the actuator. In particular, the following relation described above may be used to determine the maximum allowable current: $I_{MAX}=\mathrm{sqrt}((T_{MAX}-T_E)/(R*K_T))$, where $T_{MAX}$ may be a fixed value for a given actuator. In some examples, the maximum allowable actuator temperature $T_{MAX}$ may be set to a relatively reduced value to provide a cushion against actuator degradation. In some embodiments, if the environmental temperature cannot be determined, a worst case temperature (e.g., maximum underhood temperature) may be used as $T_E$ in the above relation.

At 322 of the method, it is determined whether the desired actuator current determined at 314 exceeds the maximum allowable actuator current. If the desired actuator current exceeds the maximum allowable current (YES), the method proceeds to 323. If the desired actuator current does not exceed the maximum allowable current (NO), the method proceeds to 334.

At 324 of the method, boost is limited to avoid degraded actuator operation. Boost limiting may include, at 326, placing the actuator at a best possible actuator position by supplying no more than the maximum allowable current to the actuator, if current has been continuously applied to the actuator for more than a threshold duration. In other words, the supply current to the actuator is limited. Continuous application of current to the actuator may occur during conditions in which maximum boost is requested, for example. The threshold duration may be set to various suitable values to ensure actuator protection (e.g., one second) without preventing actuator operation that does not risk degradation. Placing the actuator at the best possible position in turn positions the wastegate valve at the best possible lift. For example, a desired boost level (e.g., maximum boost) may be undershot by increasing the wastegate valve lift relative to the lift that would be controlled to achieve the desired boost level (e.g. zero lift/fully closed position). However, the amount by which the valve lift is increased, the amount by which the current supplied to the actuator to achieve the reduction is reduced, and the amount the desired boost is undershot, are minimums to avoid degradation of the actuator. In other words, the desired boost is undershot by a minimum value, which may minimize, or in some cases render imperceptible, the adverse impact on vehicle performance perceived by a vehicle operator. In some examples, the amount by which the valve lift is increased and the current reduced may be determined in proportion to the amount by which the desired actuator current exceeds the maximum allowable current.

At 326 of the method, the winding temperature of the actuator is optionally determined. Steps 326 and 328 of the method generally represent an approach to actuator protection in which the winding temperature is used to limit current and particularly the amount by which current is limited.

Turning now to FIG. 4, a flowchart illustrating a method 400 for determining the temperature of wastegate actuator 202 of FIG. 2 based on winding resistance is shown. Method 400 may be executed by engine controller 12 of FIG. 1, for example.

At 401 of the method, it is determined whether operating conditions are suitable for sampling winding resistances of the wastegate actuator. Suitable conditions may include the wastegate valve approaching the fully closed position (e.g., approaching valve seat 220 of FIG. 2). It will be noted that scenarios in which the valve is not approaching the fully closed position may include those in which the valve is moving away from the fully closed position (e.g., toward the fully open position), or those in which the valve is moving toward the fully closed position but will not reach the fully closed position (e.g., a desired wastegate valve lift at which the valve is to be placed does not correspond to the fully closed position).

In some examples, the suitable conditions may also stipulate the speed of approach to the fully closed position be less than a threshold. Valve speed below the threshold may afford an opportunity to determine winding resistance at multiple rotor positions according to method 400, as, in some examples, the actuator resistance may correspond to the following relation: $R=(1/I)(V-L*(dI/dt)+K*s)$, where R is the winding resistance, I is the electrical current supplied to the actuator, V is the actuator voltage, L is the winding inductance, t is time, K is a constant, and s is the valve speed. Thus, at valve speeds below the threshold, the final term $(K*s)$ of the aforementioned relation may become negligible. Under such conditions, the electrical current may be close to steady state, and thus (dI/dt) may be become negligible, making the relation $R=V/I$. Accordingly, the winding resistance may be determined if V and I can be measured or determined. In some embodiments, this simplification of winding resistance estimation may be employed in scenarios where the valve is not approaching the fully closed position. In other examples, however, winding resistance may be determined at valve speeds above the threshold by estimating the $(L*(dI/dt))$ and $(K*s)$ if constant K and inductance L are known.

The suitable conditions may further include the wastegate valve position corresponding to steady state—e.g., the valve position being constant. The valve position may be at the fully closed position, fully open position, or at any partial lift therebetween.

If, at 401 of the method, it is determined that the operating conditions are suitable for winding resistance sampling (YES), the method proceeds to 402. If it is determined that the operating conditions are not suitable for winding resistance sampling (NO), the method proceeds to 330 of method 300 of FIG. 3.

At 402 of the method, the rotor position (e.g., angular orientation) of the wastegate actuator is altered. In some examples, the engine controller may issue an altered actuator position to the wastegate actuator to thereby alter the rotor position. As described in further detail below, the rotor position may be adjusted in various suitable amounts (e.g., angles).

At 403 of the method, an intake throttle may be optionally adjusted to compensate variation in boost levels caused by deviation from the desired wastegate position to the altered wastegate position. Intake throttle 21 and/or 23 of FIG. 1 may be varied, for example. In some scenarios, intake throttle adjustment may include increasing opening of the throttle if the altered wastegate position increases the opening of the wastegate valve, and vice versa.

At 404 of the method, the winding resistance of the wastegate actuator is determined. As described above, in some examples the winding resistance may be determined by measuring the voltage and current supplied to the actuator and dividing the voltage by the current. In other scenarios in which the speed of the wastegate valve is above a threshold, the winding resistance may be determined according to the relation described above ($R=(1/I)(V-L*(dI/dt)+K*s)$).

At 406 of the method, the determined winding resistance is stored and associated with the instant actuator position. The winding resistance and actuator position may be stored in various suitable data structures, including but not limited to a lookup table.

At 408 of the method, it is determined whether a sufficient number of winding resistances have been determined. Here, the data structure in which the determined winding resistances are stored may be accessed to determine the number of winding resistances determined thus far. Various suitable numbers may be selected as a minimum number of winding resistances to ensure adequate characterization of the actuator winding resistance. Alternatively or additionally, a minimum angular range through which winding resistances are to be determined may be specified. In some examples, the data structure may be accessed to determine the rotational range of the rotor spanned by the determined winding resistances. Winding resistances may be collected throughout any suitable entire or partial rotational range of the rotor (e.g., a full turn spanning 360°, a half-turn spanning 180°, greater than a full turn). Thus, the rotor position may be altered at 402 a number of times, and, as described above, by an appropriate step size (e.g., angle). The step size and number of samples may be selected according to operating conditions and an expected duration for which conditions suitable to winding resistance may persist, for example. Accordingly, if it is determined that the number of determined winding resistances is not sufficient (NO), the method returns to 402. If it is determined that the number of winding resistances is sufficient (YES), the method proceeds to 410.

At 410 of the method, the temperature of the actuator is estimated based on the determined winding resistances. Temperature estimation may include averaging the determined winding resistances in a suitable manner to form an averaged winding resistance. The averaged winding resistance may then be used to determine a winding temperature based on known properties of the winding material(s). A lookup table having a plurality of winding resistances each associated with a winding temperature may be accessed, for example.

Returning to FIG. 3B, at 328 of the method, having successfully determined the winding temperature of the actuator at 326, the current supplied to the actuator is optionally limited based on a difference between the winding temperature determined at 326 and the maximum allowable winding temperature. In some examples, the extent to which current is limited may be proportional to the difference between the winding temperature and the maximum allowable winding temperature.

At 330 of the method, the fuel supplied to an engine (e.g., engine 10 of FIG. 1) associated with the wastegate may optionally be limited. The extent to which fuel supply is limited may be in proportion to the extent to which boost is limited, and particularly, the reduction in air supply to the engine. In this way, optimal (e.g., stoichiometric) engine operation may be maintained.

At 332 of the method, boost limiting at 324 or 328 may be reported. Reporting the limited boost may include warning a vehicle operator via a dashboard indicator, for example, and may further include recording the event in the engine controller and/or setting a diagnostic code.

At 334 of the method, one or more control gains employed in controlling the wastegate actuator are adjusted in response to actuator current limiting. In some examples, the control gains may include three PID gains ($K_P$, $K_I$, and $K_D$) that respectively control the contributions of a proportional term, an integral term, and a derivative term summed together to generate an output for an input (e.g., according to the above-described relation $u(t)=K_P*e(t)+K_I*\int e(\tau) d\tau+K_D*(de(t)/dt)$). The input may be an error such as a difference between a desired boost pressure and an actual boost pressure, a difference between a desired wastegate actuator position and an actual wastegate actuator position, a difference between a desired wastegate valve lift and an actual wastegate valve lift, etc. The output may be a wastegate actuator position, a wastegate valve lift, a boost pressure, etc. Generally, one or more control gains used to control the wastegate actuator may be modified in response to actuator current limiting. In some examples, adjustment of the one or more control gains may include reducing the one or more control gains. The extent to which the one or more control gains are reduced may be in proportion to the extent to which the actuator current is limited, for example. Alternatively or additionally, the extent to which the one or more control gains are reduced may be in proportion to the extent to which the actuator temperature exceeds a maximum allowable temperature. In some embodiments, the engine controller may determine the control gain adjustments and send the adjustments to the wastegate controller. Further, as described above, a suitable mechanism such as filtering may be employed to provide a smooth, undisruptive transition from nominal control gains to adjusted control gains.

At 336 of the method, the wastegate actuator is controlled according to the one or more adjusted control gains. Such control may cause one or more parameters determined according to the one or more adjusted control gains to differ from their values determined according to non-adjusted nominal control gains employed when actuator current is not limited. As one or more of the control gains may be reduced relative to their nominal counterparts, the responsiveness of the wastegate may decrease. The wastegate controller, for example, may determine one or more parameters (e.g., actuator current wastegate actuator position, wastegate valve lift, adjustments thereto, etc.) according to the adjusted control gains received from the engine controller.

At 338 of the method, it is determined whether the desired actuator current determined at 314 still exceeds the maximum allowable current determined at 320. If it is determined that the desired actuator current still exceeds the maximum allowable current (YES), the method returns to 338. In this case, use of the adjusted control gains may be continued to provide desired wastegate operation while actuator current is limited. If it is instead determined that the desired actuator current does not exceed the maximum allowable current (NO), the method proceeds to 340.

At 340, nominal wastegate operation is resumed. Here, because it was determined that the desired actuator current no longer exceeds the maximum allowable current, boost and actuator current limiting are no longer desired, as the maximum allowable current can be applied to the actuator with the instant operating conditions without posing an unacceptable risk of wastegate degradation. As such, the boost and actuator current limiting may be ceased along with employment of the one or more adjusted control gains. Accordingly, at 342 of the method, the nominal control gain(s) used during nominal wastegate actuator operation (while the actuator current is not limited) are employed. Here, a gradual undisruptive transition from usage of adjusted control gains to nominal control gains may be achieved by employing a suitable mechanism such as filtering. In this way, desired wastegate and wastegate actuator operation can be provided for each of nominal and current-limited operating modes by switching between corresponding control gain(s).

At 344, if it was determined at 322 that the desired actuator current does not exceed the maximum allowable current, the desired current is applied to the actuator to achieve the desired actuator position. A suitable voltage-to-current conversion mechanism may convert a voltage generated by the actuator controller to generate the current.

At 346 of the method, it is determined whether the actuator position is at the desired actuator position. Here, the sensed actuator position may be compared to the desired actuator position. In some embodiments, differences between the actuator position and the desired actuator position below a threshold may be ignored. If the actuator position is not at the desired actuator position (NO), the method returns to 314. If the actuator position is at the desired actuator position (YES), the method proceeds to 348.

At 348 of the method, the current applied to the actuator is adjusted to maintain the desired valve lift and control the actuator position. The desired valve lift may be maintained via feedback and/or feed-forward control algorithms. For example, valve lift may be controlled via an inner control loop. Thus, the applied current is adjusted when the corrected actuator position reaches a position corresponding to a desired wastegate valve position. In some examples, the desired valve lift may be maintained via the PID control described above, using the nominal control gains. Following 348, the method ends.

Some conditions may prompt use of one of the environmental temperature and the winding temperature and not the other to determine the maximum allowable current. For example, the winding temperature, and not the environmental temperature, may be used if the environmental temperature has remained substantially constant (e.g., changed 5% or less) for at least a threshold duration but at least a threshold amount of current has been applied to the actuator throughout this duration. In this case, while the environmental temperature may remain approximately unchanged, significant application of current to the actuator may affect its temperature, which may not be indicated by the sole measurement of the environmental temperature. Measurement of the winding temperature, however, may reflect this change. In other scenarios, the environmental temperature, and not the winding temperature, may be used if operating conditions are not suitable to determine the winding temperature, as determined at 401 of method 400. Similarly, winding temperature may be eschewed if a sufficient number of winding resistance samples were not obtained as determined at 408 of method 400.

Thus, as shown and described, methods 300 and 400 may be employed to reduce the potential for degraded wastegate actuator operation and degraded boost control due to excessive actuator temperature, while minimizing the extent of boost reduction and avoiding degraded operation if the actuator temperature exceeds a maximum allowable temperature. Further, desired wastegate control may be provided for both nominal and current-limited operation. It will be appreciated that methods 300 and 400 may be employed iteratively throughout wastegate operation. For example, following 342 and/or 348, method 300 may return to 302.

In another representation, a method for operating a wastegate (e.g., wastegate 200 of FIG. 2) may comprise estimating a motor current to provide a desired level of boost, and limiting a boost amount in response to a current limit based on a temperature of a wastegate actuator (e.g., actuator 202 of FIG. 2). The current limit may be based on ambient temperature, and the method may further comprise limiting a fuel amount supplied to an engine (e.g., engine 10 of FIG. 1) in response to the limited boost amount.

Turning now to FIG. 5, a graph 500 illustrating actuator current and boost limiting according to method 300 of FIGS. 3A-B for an exemplary drive cycle is shown. Graph 500 includes a plot 502 of current supplied to a wastegate actuator (e.g., actuator 202 of FIG. 2) that spans a range of currents from a minimum current (e.g., zero current supplied such as during conditions in which boost is not desired) to a maximum current (e.g., during conditions in which maximum boost is desired). Graph 500 also shows a plot 504 of boost resulting from variation in placement of a wastegate valve (e.g., valve 218 of FIG. 2) actuated by the wastegate actuator according to the current supplied thereto.

As shown, in a first duration $t_1$ maximum boost is requested, in addition to boost levels close to maximum preceding and following request of maximum boost. During $t_1$, a first maximum allowable current 506 that may be supplied to the actuator is determined, represented by dashed lines. The first maximum allowable current 506 is determined based on a maximum allowable actuator temperature in the manners described above. The desired current levels to achieve the requested boost levels throughout duration $t_1$, however, exceed the first maximum allowable current 506. As such, the current supplied to the actuator is limited to the first maximum allowable current 506 (the supplied current being shown as slightly below the first maximum allowable current for clarity in FIG. 5). Current levels that exceed the first maximum allowable current 506, and that would otherwise be supplied to the actuator, are shown in finely dashed lines in FIG. 5. A corresponding reduction in boost is also shown in plot 504, as well as the boost that would otherwise be generated, shown in finely dashed lines, without the reduction in supplied current.

Similarly, in a second duration $t_2$, maximum boost, and similarly high boost levels, is requested once more. A second maximum allowable current 508 is determined in the manners described above. However, the second maximum allowable current 508 is less than the first maximum allowable current 506, for example due to an increase in environmental temperatures surrounding the wastegate and/or the greater net current that has been supplied to the actuator during $t_2$ relative to $t_1$. As such, the current supplied to the actuator is limited to the second maximum allowable current 508 (the supplied current being shown as slightly below the second maximum allowable current for clarity in FIG. 5). Current levels that exceed the second maximum allowable current 508, and that would otherwise be supplied to the actuator, are shown in finely dashed lines in FIG. 5. A corresponding reduction in boost is also shown in plot 504, as well as the boost that would otherwise be generated in finely dashed lines without the reduction in supplied current. As described above, various actions may be taken for durations in which boost is limited due to current limiting, such as limiting the fuel supplied to an associated engine.

Graph 500 also includes a plot 510 illustrating control gain adjustment. Throughout durations $t_1$ and $t_2$, in which actuator current is limited, one or more control gains used to control the wastegate actuator are reduced relative to their nominal values employed throughout the durations before $t_1$, between $t_1$ and $t_2$, and after $t_2$. Plot 510 also illustrates the use of filtering to provide gradual transitions from nominal control gain usage to adjusted control usage, and vice versa. As such, in this example, intermediate control gains between respective nominal and adjusted values may be employed at certain instances.

It will be appreciated that graph 500 is provided for the sake of understanding and is not intended to be limiting in any way. For example, the shapes of plots 502, 504, and 510, the temporal lag therebetween, the values of the first and second maximum allowable currents 506 and 508, and the extent to which supplied current and boost are limited are merely illustrative and may be exaggerated relative to actual wastegate/vehicle operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
with a controller,
determining a temperature of a wastegate actuator based on a winding resistance of the wastegate actuator;
limiting an electric current supplied to the wastegate actuator in response to the temperature of the wastegate actuator exceeding a threshold;
proportionally adjusting one or more wastegate controller gains based on the limited current; and
driving the wastegate actuator based on desired boost with the one or more adjusted wastegate controller gains.

2. The method of claim 1, wherein adjusting the one or more wastegate controller gains includes reducing the one or more wastegate controller gains relative to respective nominal gains only while limiting current supplied to the wastegate actuator, and operating with the nominal, non-limited gains otherwise during engine operation when the temperature does not exceed the threshold.

3. The method of claim 2, further comprising, with the controller, limiting lift of a wastegate valve coupled to the wastegate actuator responsive to limiting the current supplied to the wastegate actuator.

4. The method of claim 1, wherein the one or more wastegate controller gains include a proportional gain, an integral gain, and a derivative gain.

5. The method of claim 4, wherein the proportional gain, the integral gain, and the derivative gain determine respective contributions of a proportional term, an integral term, and a derivative term, the proportional term, integral term, and derivative term summed to provide an output for an input.

6. The method of claim 5, wherein the input is an error between a desired wastegate actuator position and an actual wastegate actuator position.

7. The method of claim 1, wherein the one or more wastegate controller gains control wastegate valve positioning responsiveness.

8. The method of claim 1, further comprising:
with the controller,
when engine operating conditions are suitable for winding resistance sampling, determining a winding resistance at each of a plurality of wastegate positions, and storing the determined winding resistances.

9. The method of claim 1, wherein adjusting the one or more wastegate controller gains includes, with the controller, filtering the one or more wastegate controller gains during a transition between driving the wastegate actuator with the one or more adjusted wastegate controller gains and driving the wastegate actuator with respective nominal wastegate controller gains.

10. The method of claim 1, wherein the one or more wastegate controller gains are adjusted by the controller in proportion to an extent to which the temperature of the wastegate actuator exceeds the threshold.

11. The method of claim 1, further comprising:
after adjusting the one or more wastegate controller gains responsive to limiting the current supplied to the wastegate actuator, determining that the temperature of the wastegate actuator no longer exceeds the threshold; and
setting the one or more wastegate controller gains to respective nominal values.

12. A method, comprising:
with a controller,
determining a temperature condition;
limiting an electric current supplied to a wastegate actuator responsive to the temperature condition;
adjusting each of one or more wastegate actuator control gains in proportion to an extent to which the electric current supplied to the wastegate actuator is limited; and
driving the wastegate actuator based on desired boost with the one or more adjusted wastegate actuator control gains.

13. The method of claim 12, wherein the temperature condition prompts limiting of the current supplied to the wastegate actuator if a temperature of the wastegate actuator exceeds a threshold.

14. The method of claim 12, wherein the one or more wastegate actuator control gains include a proportional gain, an integral gain, and a derivative gain.

15. The method of claim 12, wherein adjusting the one or more wastegate actuator control gains in proportion to an extent to which the electric current supplied to the wastegate actuator is limited includes reducing the one or more wastegate actuator control gains, relative to respective nominal gains used when the current supply to the wastegate actuator is not limited, in proportion to the extent to which the electric current supplied to the wastegate actuator is limited.

16. The method of claim 12, further comprising, with the controller, filtering the one or more wastegate actuator control gains during a transition between driving the wastegate actuator with the one or more adjusted wastegate actuator control gains and driving the wastegate actuator with respective nominal wastegate actuator control gains.

17. The method of claim 12, wherein adjusting each of the one or more wastegate actuator control gains in proportion to the extent to which the electric current supplied to the wastegate actuator is limited comprises multiplying each of the one or more actuator control gains by a same constant, the constant determined as a function of the extent to which the electric current supplied to the wastegate actuator is limited.

18. A boost control system, comprising:
a turbocharger including a wastegate having a wastegate actuator coupled to a wastegate valve; and
a controller configured to:
determine a temperature of the wastegate actuator;
when the temperature of the wastegate actuator exceeds a threshold, reduce one or more control gains in proportion to an extent to which the temperature of the wastegate actuator exceeds the threshold, and drive the wastegate actuator based on desired boost with the one or more reduced control gains; and
when the temperature of the wastegate actuator does not exceed the threshold, drive the wastegate actuator based on the desired boost with one or more nominal control gains, the one or more nominal control gains greater than the one or more reduced control gains.

19. The boost control system of claim 18, wherein the controller is further configured to adjust the one or more reduced control gains based on an electric current supplied to the wastegate actuator.

20. The boost control system of claim 18, wherein the one or more reduced or nominal control gains include a proportional gain, an integral gain, and a derivative gain.

* * * * *